July 13, 1937. J. A. BACHMANN ET AL 2,086,891
METHOD OF TREATMENT FOR FERMENTED AND DISTILLED BEVERAGES AND THE LIKE
Filed Oct. 23, 1934
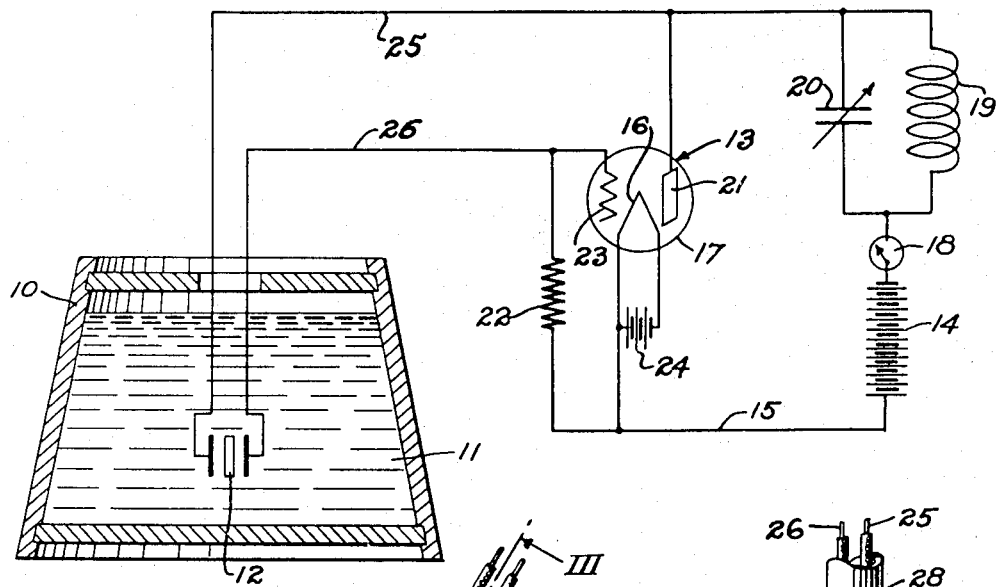
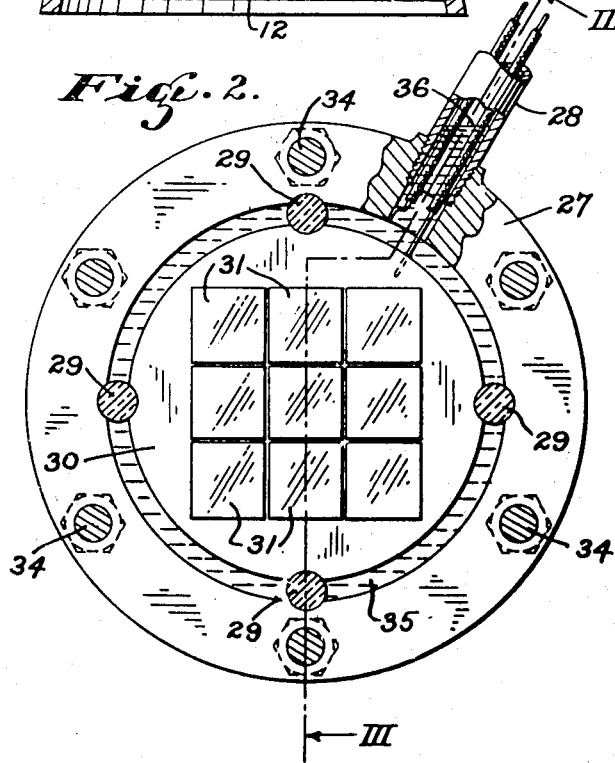
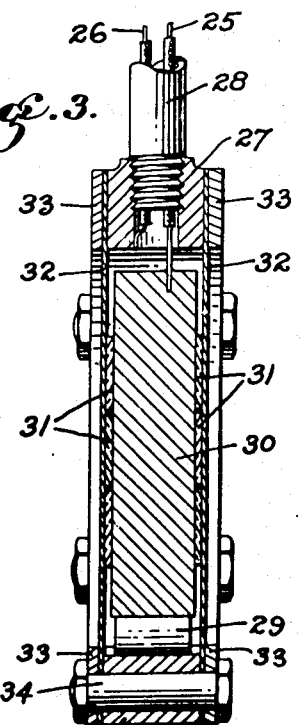
INVENTOR.
Jakob A. Bachmann
Roy Wilkins
BY
ATTORNEY Patented July 13, 1937

2,086,891

UNITED STATES PATENT OFFICE 2,086,891

METHOD OF TREATMENT FOR FERMENTED AND DISTILLED BEVERAGES AND THE LIKE

Jakob August Bachmann, Alameda, and Roy Wilkins, Hamburg, Calif.

Application October 23, 1934, Serial No. 749,574

16 Claims. (Cl. 99—48)

This invention relates to an improved method and apparatus for treating beverages to effect chemical and physical changes therein and more particularly to a new and improved method for treating fermented and distilled beverages which will produce, in a more expeditious manner than has heretofore been possible, characteristic similar to those possessed by naturally aged beverages.

The principal object of the invention is to provide an improved treatment for fermented and distilled beverages, such as wine, whiskey, brandy and rum wherein the changes which take place under normal aging involve slow and complicated reactions.

In the art to which this invention relates it is well known that beverages of the character contemplated by this invention, after long periods of storage, improve in a natural manner in palatability mellowness and bouquet. It is also well known that the improvement in the beverages is due to chemical and physical actions. It is therefore a further object of this invention to provide an improved method of treating fermented and distilled beverages which will accelerate the above chemical and physical actions and thus reduce the time required to render the beverages saleable.

During the course of natural aging of beverages of the type contemplated by this invention manifold and varied changes of a chemical and physical nature take place. Some of these changes are favorable and some are the direct opposite to what is finally required. Many of the intricate changes which take place in an aging liquor are now known to chemists but, by no means, are all of them clearly understood. A distilled alcoholic beverage aged for a period of time becomes as a rule slightly stronger in proof and it has a higher extract, ester, aldehyde, etc. number. These latter characteristics are the result of a slow and uncertain process going on over years once the beverage has entered its cooperage.

During the process of aging certain essential by-products formed by interaction with certain compounds present in the wood of the container and by gradual osmotic processes in which the wood (oak) of the barrel acts as a membrane, undergo slow gradual changes which result, over a number of years, in an essentially changed end product as compared to the original raw product. The bouquet becomes more definite, the taste milder and rounder. This is due largely to the already mentioned fact of slow but definite interaction between alcohol and acid, forming esters and finally between the esters and other complex organic groups present in the wood of the barrel. Time, temperature, atmospheric pressure, available oxygen and humidity also enter in no small measure. The most important of these reactions is the formation of esters, a group of highly volatile organic bodies which form a substantial basis for the bouquet and taste of the beverage. These esters are formed by the condensation of an alcohol with an acid together with the formation of water.

During and after the slow oxidations of alcohol and aldehydes, finally resulting in formation of the esters, interactions are taking place which consist of an interchange of radicals of the esters present and/or formed with the alcohols and acids present or formed until a stable equilibrium is established according to the affinity of the parts interacting and the stability of the products formed.

It is known that the velocity of the above reaction is increased by temperature, but as the temperature increases the velocity both of formation and decomposition increases, hence a change in temperature alone has very small effect upon permanent changes of the equilibrium.

In distilled liquors such as rum, whiskey and brandy, and in the preparation of red wines and of certain white wines produced by the red wine process, there also occurs the extraction of tannin substances from the wood of the container or from other extract supplying media. This is important as the tannin substances which are of a glucoside nature hydrolize into their sugar and acyl components. Of the sugars thus produced rhamnose is the most important as it imparts the rich reddish brown color desired in whiskey, brandy and the like. The acyl components of the tannins are mostly compounds of the flavone group.

As a result of experimentation we have discovered that when a newly fermented or distilled beverage is subjected to compressional waves of super-sonic frequency it is possible to produce characteristics therein corresponding to those possessed by a properly aged beverage or in other words, to improve the color, palatability, mellowness and bouquet and thus produce in hours what has in the past taken months and in extreme cases years to accomplish.

In carrying out our invention we propose to subject the beverage in a suitable container to compressional waves produced by a piezo-electric crystal or by a magnetostrictive device. Devices of this latter character have been constructed to operate at frequencies up to 300,000 per second and piezo-electric crystals can be obtained which will produce frequencies in excess of 15,000,000 cycles per second.

We have found that the most desirable frequency is approximately 2,000,000 cycles per second, but from our experience it appears that satisfactory results can be obtained at 50,000 cycles per second and up to as high as 15,000,000 cycles per second. When the higher frequencies are used it will be found that for equal power input the desired results will be obtained in a shorter period of time.

When the beverage under treatment, in accordance with this invention, is contained in a suitable barrel or cask, the extraction of tannin will take place in much the same manner as where the beverage is aged in wood in the natural way.

If the process is to be carried out in a glass lined tank or similar container the tannin and extract supplying ingredients may be placed therein with the beverage. Under these conditions we have found that oak shavings can be used with good effect.

The effects produced by the application of super-sonic compressional waves upon the reactions which take place within the beverage under treatment are not at present entirely understood. The compressional waves appear to exert an oxidizing effect particularly when oxygen is present and, therefore, they have a beneficial and accelerating influence upon aldehyde oxidation and esterification. From our experiments it also appears that these compressional waves exert a hydrolytic or molecular disrupting influence which facilitates and greatly accelerates the rearrangement of radicals according to the natural affinities.

As evidence of the above we have found that when a beverage is subjected to our treatment in the presence of oak the hydrolysis of tannin extracted is greatly accelerated. Liquors thus treated assume a reddish brown color in a very short time. For example, a liquor treated several hours with compressional waves having a frequency of 1,800,000 cycles per second in the presence of oak chips showed color and characteristics such as taste and bouquet comparable to a liquor aged naturally in wood for a period in excess of one year.

The application of compressional waves subjects the beverage to molecular disturbances and/or high internal pressures and as a result molecular bonds may in some instances be disrupted and/or in other instances a rearrangement of radicals thus mobilized is facilitated until, under the influence of the piezo-electrical and/or thermo-dynamic action, an equilibrium is established.

It has been found that super-sonic waves having a high frequency of the order contemplated by this disclosure produce a thermo-dynamic and/or piezo-chemical change in the beverage with a minimum dissipation of the energy in the form of heat. This is due to the fact that the liquid is very elastic and as a result the action will follow approximately the laws of a perfect gas with a minimum liberation of heat.

The beverage under treatment in an open container shows a slight surface ripple and evaporation takes place at a low temperature. Some of the highly volatile acrid constituents seem to evaporate and escape at a low temperature and as a result the beverage rapidly reached a point of stable heat equilibrium well below the temperature where a cooked taste may be imparted thereto.

The application of super-sonic compressional waves to the beverage can be accomplished in a number of ways. A convenient, adaptable and preferred method is to submerge a compressional wave producing unit in the beverage.

In the accompanying drawing we have, for the purpose of facilitating a full and complete understanding of the invention, shown by way of illustration and not of limitation a preferred form of apparatus which can be conveniently used in carrying out our improved method of treatment.

In the drawing:

Fig. 1 is a diagrammatic view showing a piezo-electric crystal submerged in a beverage and connected to a conventional high frequency oscillating electric circuit, Fig. 2 is a fragmentary side elevation of a piezo-electric crystal unit with parts broken away and one of the plates removed to disclose the internal construction, and Fig. 3 is a sectional view of the complete unit taken along line III—III of Fig. 2.

In the drawing 10 designates a suitable container such as is used in storing, aging and/or treating fermented and distilled beverages. The container 10 can be in the form of a metal tank or a barrel or cask of wood. If the container is of wood it should preferably be constructed of oak, as the oak will supply the tannin extracts such as are so essential in the aging and/or treating of the beverages contemplated by this invention. The container 10 is shown with a beverage 11 having a piezo-electric crystal 12 submerged therein so that when the piezo-electric crystal is excited, as will hereinafter appear, compressional waves of super-sonic frequency will be set up within the beverage. The piezo-electric crystal 12 is diagrammatically illustrated as connected in an oscillating electric circuit which is capable of generating an alternating current of super-sonic frequency. This oscillator circuit, designated generally by the numeral 13, is supplied with a high tension current from a battery 14 or other suitable source. One side of the battery 14 is connected through a wire 15 with a filament 16 of an oscillator tube 17 and the other side of the battery 14 is connected through an ammeter 18, and a tuned circuit, which includes an inductance 19 and a capacity 20, to a plate 21 of the oscillator tube 17. In addition to connecting the battery 14 with the filament 16 of the oscillator tube 17, the conductor 15 also connects through a suitable grid bias resistance 22 with a grid 23 of the oscillator tube 17. A battery 24 serves to supply the filament 16 of the oscillator tube 17. This circuit with the piezo-electric crystal 12 connected to the plate 21 and the grid 23 of the oscillator tube 17 respectively by conductors 25 and 26 provides a source of self-sustained alternating current of super-sonic frequency as is well understood in the art.

While we have in the drawing illustrated the beverage 11 as contained in a wooden container 10, it is to be understood that our invention can be carried out in a glass or suitable metallic container, providing the proper extract producing media is placed within the container with the beverage. We have found that oak chips can be successfully used in a glass or proper metallic container for this purpose. It is to be also understood that a magnetostrictive unit may, when desired, be substituted for the piezo-electric crystal 12.

The details of construction of the piezo-electric crystal unit 12 is not important in carrying out our invention except that it must be capable of producing compressional waves having a supersonic frequency of the magnitude contemplated by our invention. It should also be pointed out that the crystal may be arranged with respect to the beverage in various ways. For instance, it may be disposed on a horizontal plane or upon a vertical plane as illustrated in Fig. 1 of the drawing. In connection with certain types of containers the crystal may also be located externally upon one of the walls thereof. However, in order that our invention may be readily employed in wineries and distilleries as now equipped we propose, as a preferred method of procedure, to submerge the piezo-electric crystal or a magnetostrictive unit into the beverage and for this purpose we have illustrated a suitably constructed unit in Figs. 2 and 3 of the drawing. As here illustrated, the piezo-electric crystal 12 comprises an annular ring portion 27 having a tubular conduit 28 by means of which the ring 27 may be suspended in a beverage, as illustrated in Fig. 1 of the drawing. Mounted within the ring 27 by means of insulating quartz rods 29 there is an electrode 30 of a relatively large mass. Secured upon each side of the electrode 30 is one, or a plurality of piezo-electric crystals 31. In the drawing we have shown nine such crystals upon each side of the electrode 30. Secured upon the sides of the ring 27 and disposed in cooperating relation with the piezo-electric crystals 31 there are two additional electrodes 32 of relatively thin dimension. These electrodes 32 are firmly secured at their periphery to the sides of the ring 27 by means of clamping rings 33 and bolts 34. When properly secured upon the ring 27 the electrodes 32 will form a fluid tight compartment in which an insulating medium 35 may be retained. The insulating medium 35 may be introduced through the conduit 28 and a sufficient quantity thereof will be introduced to provide for a reserve in the tube 27, as shown at 36. Before assembly, the conductors 25 and 26 which connect with the oscillator circuit will be connected to the electrodes 30 and 32, as is clearly shown in the drawing.

When the piezo-electric unit is thus constructed the crystals 31 will vibrate under the influence of the high frequency alternating current impressed thereupon through the conductors 25 and 26 and thus cause the electrodes 32 to vibrate and produce high frequency compressional waves within the surrounding beverage.

It is contemplated that our invention will find its greatest use in the treatment of fermented and distilled beverages to facilitate aging and the chemical changes produced thereby, but it is to be understood that it may also be used to accelerate the solution and precipitation of solids in a fluid and in the clarification of beverages as where albumin, gelatin, isinglass, milk-casein, etc. is pr 'ipitated in the presence or absence of tannin substances or other coagulants. In carrying out the latter treatment we have, by an overnight application of super-sonic compressional waves in accordance with our invention, produced sediment which, under natural conditions, would take weeks to produce.

It will be evident from the above description that we have devised a novel and useful method for the treatment of fermented and distilled beverages and the like and while we have, for the sake of clearness and in order to disclose the invention so that the same can be readily understood, described a preferred method of procedure and illustrated specific devices, it is to be u .er- stood that this invention is not limited to the specific procedure and means disclosed, but may be embodied in other ways that will suggest themselves to persons skilled in the art. It is believed that this invention is broadly new and it is desired to claim it so that all such changes as come within the scope of the appended claims are to be considered as part of our invention.

Having thus described our invention, what we claim and desire to secure by Letters Patent is—

1. An improved method for accelerating the artificial aging of raw fermented and distilled alcoholic beverages to effect chemical and physical changes and produce therein characteristics of a time-aged beverage, which comprises subjecting the beverage in the liquid state as a compact mass to the direct action of mechanically produced compressional waves of supersonic frequency.

2. The improvement in the art of artificially aging fermented and distilled alcoholic beverages, which consists in producing thermodynamic and piezo-chemical action in the liquor by submerging a piezo-electric crystal in the beverage as a compact mass and exciting said piezo-electric crystal with an alternating current of supersonic frequency.

3. The improvement in the art of artificially aging fermented and distilled alcoholic liquors, which consists in subjecting the liquor as a compact liquid mass to the direct action of a vibrating piezo-electric crystal operating at a supersonic frequency, whereby an internal thermodynamic and piezo-chemical oxidation accelerating action will be produced within the liquid mass.

4. The process of accelerating the artificial aging of fermented and distilled alcoholic liquor, which comprises subjecting the liquor in an oak container and in the presence of air to the chemical reaction accelerating influence of mechanically produced compressional waves having a supersonic frequency.

5. The process of accelerating artificial aging of fermented and distilled alcoholic liquor, which comprises subjecting the liquor in its liquid state as a stationary mass and in the presence of air and an extract supplying agency to the chemical reaction accelerating influence of internally produced compressional waves of supersonic frequency.

6. The process of accelerating the artificial aging of fermented and distilled alcoholic liquor, which comprises subjecting the liquor in liquid form as a mass in the presence of oxygen and an extract supplying agency to the chemical reaction accelerating influence of compressional waves of supersonic frequency.

7. The process of accelerating the artificial aging of fermented and distilled alcoholic liquor, which comprises placing the liquor in an open container with suitable extract supplying materials and setting up compressional waves of supersonic frequency within said liquor, whereby the aging oxidation and esterification will be accelerated.

8. The process of aging distilled alcoholic beverages, which comprises placing the beverage in an open chemically inert container with a tannin containing medium, and subjecting the beverage in liquid form as a mass to the action of an electrically excited piezo-electric crystal vibrating at a supersonic frequency, whereby the aging conversion of alcohols to corresponding aldehydes to acid to esters will be materially accelerated.

9. The process of aging a distilled alcoholic liquor, which comprises placing the liquor in liquid form in a suitable container with an oxygen and tannin extract supplying medium, and subjecting the liquor to the compressional wave producing action of an electrically insulated piezo-electric crystal vibrating at a supersonic frequency, whereby the oxidation of aldehydes to acids will be materially accelerated.

10. The method of treating distilled alcoholic liquors to accelerate the natural aging reactions and impart thereto the characteristics of a time-aged product, which comprises placing the liquor in an open container with tannin supplying materials, and subjecting the liquor in the liquid state as a compact mass to the influence of mechanically produced compressional waves of supersonic frequency.

11. The method of artificially aging distilled alcoholic liquors to impart thereto the characteristics of a time-aged product, which comprises placing the liquor in a suitable container in the presence of oxygen and tannin supplying materials, and subjecting the liquor in its liquid state and as a compact mass to a mechanically vibrating device having a supersonic frequency of vibration, whereby compressional waves will be set up internally within the liquid mass.

12. The process of artificially aging distilled alcoholic liquors and accelerating the natural chemical reactions to thus reduce the time required in maturing the liquor, which comprises placing the liquor in liquid form in a suitable container with an oxygen supplying medium and extract supplying materials, and producing compressional waves in the liquor with an electrically excited piezo-electric crystal operating at a supersonic frequency.

13. The process of artificially aging distilled alcoholic liquors and accelerating the natural chemical reactions to thus reduce the time required in maturing the liquor, which comprises placing the liquor in liquid form in a suitable container with an oxygen supplying medium and extract supplying materials, and producing compressional waves in the liquor with an electrically excited magnetostrictive device operating at a supersonic frequency.

14. The method of artificially aging fermented and distilled alcoholic beverages, which comprises subjecting the beverage in liquid form in a container allowing access of the atmosphere to the oxidizing and chemical reaction accelerating influence of an electrically excited piezo-electric crystal operating at a supersonic frequency, whereby internal compressional waves will be set up within the liquid and result in the production of an oxidizing action.

15. The method of artificially aging a fermented alcoholic beverage to accelerate coagulation and clarification and produce characteristics of a time-aged beverage, which comprises subjecting the beverage as a liquid mass and in the presence of a coagulating and clarifying agency to the action of mechanically produced compressional waves of supersonic frequency.

16. The method of artificially aging a fermented alcoholic beverage to accelerate coagulation and clarification and produce characteristics of a time-aged beverage, which comprises subjecting the beverage in liquid form and in the presence of tannin supplying material and a clarifying agency to the action of mechanically produced compressional waves of supersonic frequency.

JAKOB AUGUST BACHMANN.
ROY WILKINS.

DISCLAIMER 2,086,891.—*Jakob August Bachmann*, Alameda, and *Roy Wilkins*, Hamburg, Calif. METHOD OF TREATMENT FOR FERMENTED AND DISTILLED BEVERAGES AND THE LIKE. Patent dated July 13, 1937. Disclaimer filed September 29, 1939, by the patentees.

Hereby enter this disclaimer to claims 1, 4, 5, 6, 7, 10, and 11 of the specification.

[*Official Gazette October 24, 1939.*]